C. B BROWN.
Harvester Rake.
No. 104,927.  Patented July 5, 1870.
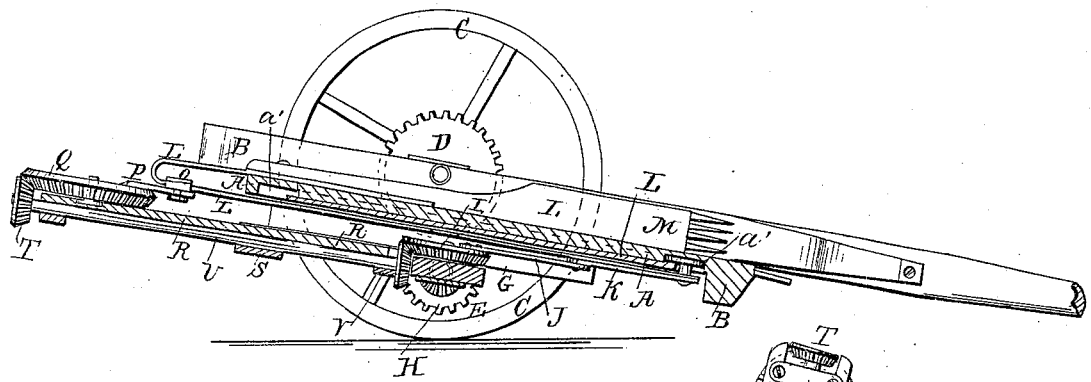
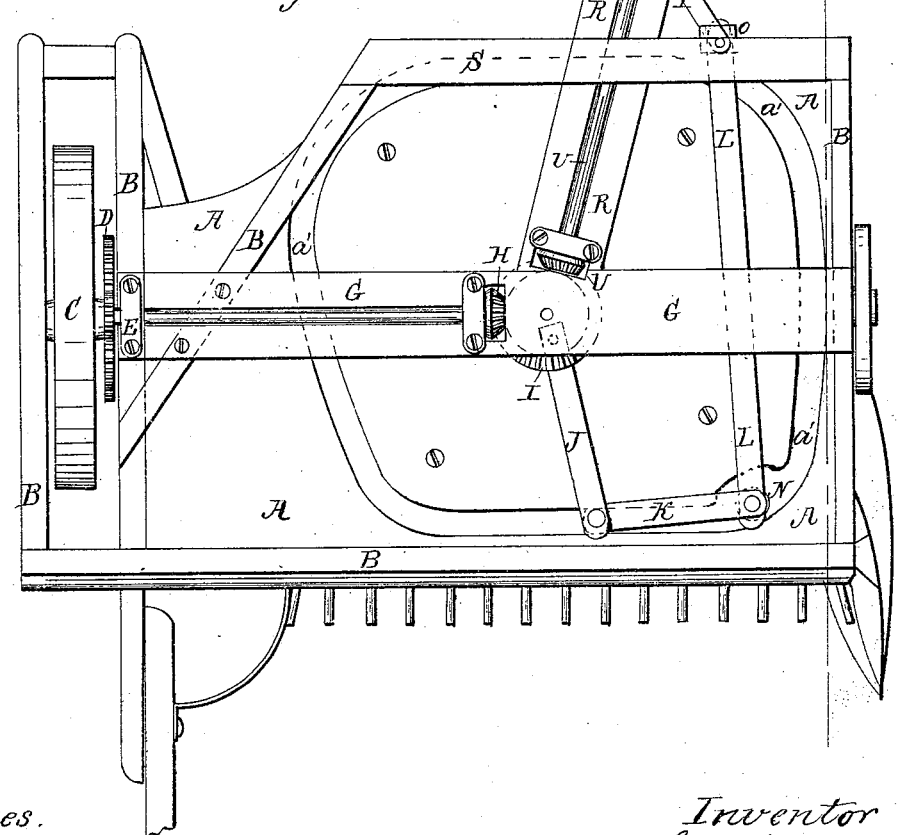

UNITED STATES PATENT OFFICE.

COLLINS B. BROWN, OF SPRINGFIELD, MISSOURI.

IMPROVEMENT IN HARVESTER-RAKES.

Specification forming part of Letters Patent No. 104,927, dated July 5, 1870.

*To all whom it may concern:*

Be it known that I, COLLINS B. BROWN, of Springfield, in the county of Greene and State of Missouri, have invented a new and useful Improvement in Self-Rake for Harvesters; and I do hereby declare that the following is a full, clear, and exact description thereof, which will enable others skilled in the art to make and use the same, reference being had to the accompanying drawings, forming part of this specification.

Figure 1 is a detail sectional view of a harvester-platform to which my improved self-rake has been attached. Fig. 2 is an under-side view of the same.

Similar letters of reference indicate corresponding parts.

My invention has for its object to furnish an improved self-raking attachment for harvesters, which shall be simple in construction, and effective and reliable in use; and it consists in the construction and combination of the various parts of the attachment, as hereinafter more fully described.

A represents the platform of a harvester. B represents the frame-work. C is the drive-wheel, the journals of which revolve in bearings attached to the frame B. D is a larger spur-wheel, fixed on the shaft of said drive-wheel, and gearing with the smaller spur-wheel E on the outer end of the shaft F, which has its bearings in a groove or slot in the under side of the plank G, the latter being so attached to the frame B as to leave a clear space between it and the platform A. On the inner end of shaft F is a bevel-gear, H, whose teeth mesh with those of a larger bevel-gear, I. An arm, J, is rigidly attached to the upper side of the gear I, and pivoted at its outer end to a link, K, of the rake-arm L. The pivoted connection of the link K and rake-arm L is provided with a friction-roller, M, which works in a nearly circular groove, $a'$, in the platform A. The other end of the rake-arm L slides in a sleeve or guide, O, pivoted to the rigid arm P of the bevel-gear Q, which is pivoted to the end of the rearwardly-extended plank or beams R. Said gear Q meshes with the gear T of the shaft U, which has its bearings in a slot or groove of plank R, and is provided at its inner end with a bevel-gear, V, which meshes with the gear P. S is a cross-bar for supporting the plank R. The rake-arm L, as will be observed, is bent at its rear end, extending thence along both sides of the platform A, and attached on the upper side to the broadened rake-head M.

By this construction the rear part of the rake-arm L is supported and guided as the rake-head is moved over the platform to sweep off the grain. By this construction the rake will be operated to sweep the grain from the platform with an easy natural movement, and will deposit the grain upon the ground in a neat, even, and compact gavel.

Having thus described my invention, I claim as new and desire to secure by Letters Patent—

1. The arrangement of the rake-arm L and rake-head M with reference to the platform A, provided with the groove $a'$, as shown and described, for the purpose specified.

2. The combination of the spur-gears D E, shaft F, gear-wheels H I, shaft U, gear-wheels T V, arm J P, guide O, link K, and rake L M, with the drive-wheel C and platform A, provided with groove $a'$, substantially as shown and described.

COLLINS B. BROWN.

Witnesses:
JAS. R. MILNER,
A. P. HOLCOMB.